United States Patent [19]

Jung et al.

[11] 4,142,415
[45] Mar. 6, 1979

[54] DEVICE FOR CONTINUOUSLY MEASURING THE LIQUID LEVEL IN A CONTAINER

[75] Inventors: Wilhelm Jung, Giessen-Kleinlinden; Horst Kister, Wehrheim, Taunus, both of Fed. Rep. of Germany

[73] Assignee: VDO Adolf Schindling AG, Frankfurt am Main, Fed. Rep. of Germany

[21] Appl. No.: 841,111

[22] Filed: Oct. 11, 1977

[30] Foreign Application Priority Data

Oct. 9, 1976 [DE] Fed. Rep. of Germany ....... 2645716

[51] Int. Cl.² .............................................. G01F 23/26
[52] U.S. Cl. .................................................. 73/304 C
[58] Field of Search .......................... 73/304 C, 304 R; 324/60 C, 61 P

[56] References Cited

U.S. PATENT DOCUMENTS 3,827,300 8/1974 Thaler ................................ 73/304 C

FOREIGN PATENT DOCUMENTS 1,134,258 11/1956 France ..................... 73/304 C
819711 9/1959 United Kingdom .................. 73/304 C
819712 9/1959 United Kingdom .................. 73/304 C Primary Examiner—Richard C. Queisser
Assistant Examiner—Joseph W. Roskos
Attorney, Agent, or Firm—Otto John Munz

[57] ABSTRACT

A device for continuously measuring the liquid level in a container, wherein a capacitive sensor is disposed in the liquid to be measured and is connected with an oscillator as the frequency controlling element thereof, the output of the oscillator being connected with a suitable indicator or control, and wherein the capacitive sensor is formed of an elongate flexible strip of insulating material having opposite faces, with a plurality of elongate conductive elements embedded in the strip of material spaced approximately equidistantly from the opposite faces so that an electric field generated between the conductive elements can be substantially equally acted upon simultaneously on both sides of the device by the liquid to be measured, thereby enhancing the sensitivity of the sensing element, and enabling linear gauge characteristics to be obtained in irregularly shaped containers.

9 Claims, 4 Drawing Figures

U.S. Patent
Mar. 6, 1979
4,142,415
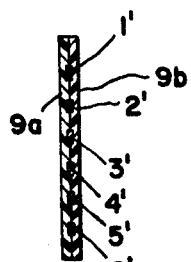
FIG. 1
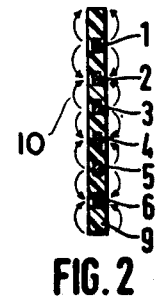
FIG. 2
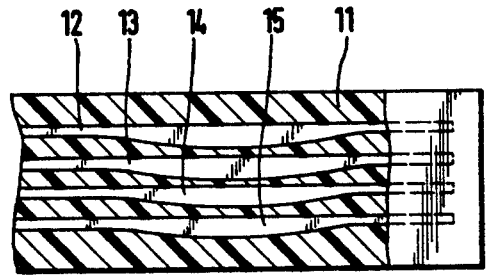
FIG. 3
FIG. 5
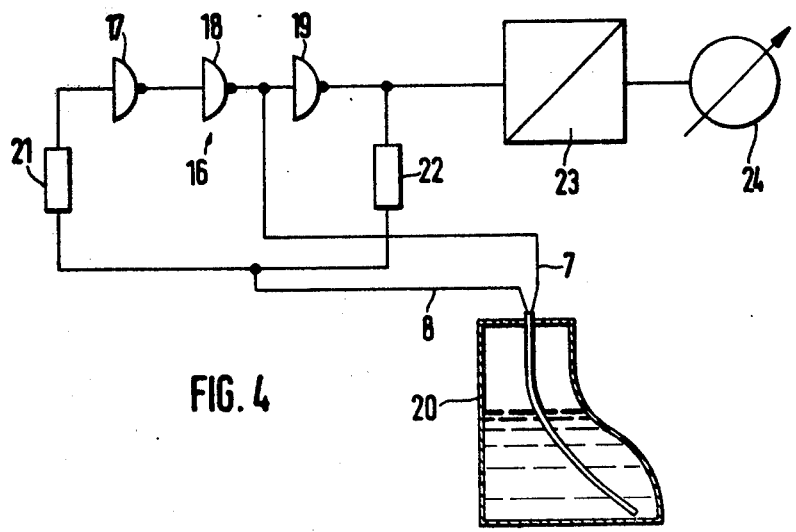
FIG. 4

DEVICE FOR CONTINUOUSLY MEASURING THE LIQUID LEVEL IN A CONTAINER

BACKGROUND OF THE INVENTION

The invention relates to a device for continuously measuring the liquid level in a container, particularly in fuel container of a motor vehicle, by means of a capacitive sensor which is an oscillation-determining element of an oscillator whose output is connected to a controlling and/or indicating stage.

Devices for continuously measuring the liquid level in a container are known which contain a float and a resistance element contolled thereby whose variable part is positioned in an indicating circuit. Such devices present the disadvantage that their field of application is limited to certain container shapes and that in irregularly shaped containers they have a non-linear characteristic, which is undesirable in many cases. Moreover, their weight is relatively heavy and their structural volume large.

Furthermore, measuring devices are known that contain a capacitive sensor with two parallel electrodes, insulated from each other and from the measuring liquid, which sensor is an oscillation-determining element of an oscillator. The frequency change of the oscillator, based on the change of capacity, is indicated in an indicating stage. These devices, to be sure, can be employed much more extensively than the resistance element type described above, but they operate satisfactorily only when the relative dielectric constant of the liquid to be measured is relatively large, as is the case for example, in water.

SUMMARY OF THE INVENTION

These disadvantages of the known devices are overcome by the invention. The purpose of the invention is therefore to produce a liquid level measuring device which, regarding the shape of the containers as well as the relative dielectric constant of the liquid to be controlled, can be employed extensively. Especially, this invention is capable of being utilized in irregularly shaped containers in such a way that a linear gauge characteristic is achieved and it is particularly suitable for liquid level measurement in fuel containers.

This object is accomplished according to the invention by means of a device wherein the sensor consists of a number of oblong electrodes which are arranged in an insulating material body, in such a way that the electric field originating between the electrodes is effectively controllable from both sides of the insulating material body by the liquid and the oscillator consists of one or more circuits in an integrated structure which permits the production of highly resistive input impedances.

Such a structure of the sensor and the oscillator achieves the result that even with a small relative dielectric constant, as for example, that of fuel, a capacity change occurs between full and empty container conditions, which suffices for a fully satisfactory utilization. Moreover, the sensor structure of the invention, when suitably dimensioned, permits the production of nearly any gauge characteristic. Therefore not only can a linear gauge characteristic be obtained in containers of a more complicated shape, but also certain non-linear characteristics can be obtained as required, e.g., for a residual quantity indication with great accuracy.

According to an advantageous embodiment of the invention, the sensor is shaped in the manner of a flexible ribbon cable. Such a structure allows a particularly simple and rapid change of the gauge characteristic within wide limits. To achieve a robust structure suitable for utilization in motor vehicles, it is advisable to construct the individual electrodes in the form of a strand and to embed them in a mass of insulating material. Furthermore, it has proved suitable to use electrodes with a rectangular cross section. Thereby the capacity change between full and empty container conditions can be further increased. When a particularly light weight of the sensor is considered important, the latter may also be made of two insulating material foils, on one of which the electrodes are evaporated or printed and which are pasted or welded together so as to enclose the electrodes between them whereby the electrodes are then embedded in the insulating body formed by the two insulating material foils.

In another embodiment of the invention, the sensor consists of a rigid insulating material body which contains electrodes of a width that differs along their longitudinal axis. In such a sensor, the adjustment of the desired gauge characteristic is carried out by varying the electrode width along the longitudinal axis of the electrodes. Such a sensor presents, in comparison with those described above, the advantage that it is particularly shockproof. A certain disadvantage consists in the fact that the production of the gauge characteristic is somewhat more difficult.

The oscillator circuit or circuits are most practically constructed in CMOS technology. With regard to the cost of manufacture, it proved particularly advantageous to construct the oscillator in such a way that it consists of three series-connected inverters, the output of the second one being connected, via the sensor and a first resistor, to the input of the first one, and via a second resistor to the output of the third one.

The evaluation of the oscillator output signal takes place most suitably by a monostable multivibrator connected in series to the oscillator so as to follow it. A quotient measuring mechanism for measuring value indication is connected to the output of the multivibrator. The monostable multivibrator serves in this case to transform the pulse train coming from the oscillator and having a frequency that varies according to the filling level, into a train of pulses of the same energy content, which train of pulses is of the same frequency as the pulse train transmitted by the oscillator. The pulses of the same energy content are then integrated by the quotient measuring mechanism. In this structure, a commercial IC structural element which is normally used in speedometers can be advantageously emloyed. Among other things, such a structural element contains, besides a monostable multivibrator for the transformation of a train of pulses of varying frequency into a train of pulses of the same energy content and the same frequency as the supplied pulse train, a voltage stabilization which can also be employed for feeding the oscillator. Thereby the cost of a normally required operating voltage stabilizer is saved.

The invention will be explained in greater detail with the aid of the drawing which contains two embodiments.

BRIEF DESCRIPTION OF THE DRAWINGS

FIG. 1 is a plan view of a sensor constructed as a flexible ribbon cable;

FIG. 2 is a cross section through the sensor according to FIG. 1, along line II—II;

FIG. 3 is a plan view upon a sensor with a rigid insulating material body;

FIG. 4 is a circuit diagram of the device; and

FIG. 5 is a view in section, similar to FIG. 2, of a modified form of sensor.

DETAILED DESCRIPTION OF THE INVENTION

A preferred form of the sensor is shown in FIGS. 1 and 2, and comprises six strand-like electrodes 1, 2, 3, 4, 5 and 6, of rectangular cross section; electrodes 1, 3 and 5, and electrodes 2, 4 and 6 each being electrically connected to each other and to a connecting element 7 or 8, respectively. The electrodes are positioned in an insulating material body 9 which insulates them from each other as well as from the liquid to be measured. The layers of the insulating material body 9 that insulate the electrodes from the liquid are made so thin that the electric field 10 originating between the electrodes can be acted upon from both sides of insulating material body 9. The whole arrangement is flexible, so that the setting of specific gauge characteristics is possible without difficulties.

Embodiment

An embodiment of the invention is shown in FIG. 3, and is provided with a rigid insulating material body 11 with four electrodes 12, 13, 14 and 15 arranged therein, and whose width varies along their longitudinal axis for the purpose of achieving a specific gauge characteristic. The connection of electrodes 12, 13, 14 and 15 takes place as in the sensor above described.

As shown in FIG. 4, the circuitry for the device consists of an oscillator 16 which consists of three series-connected inverters 17, 18 and 19. The output of the second inverter 18 is connected, via the sensor, which is constructed in the manner of a flexible ribbon cable, as shown in FIG. 1, and for the purpose of a linear gauge characteristic is in the irregularly shaped container 20 correspondingly deformed, and via a first resistor 21 to the input of inverter 17, and via a second resistor 22 to the ouput of inverter 19. An indicating instrument 24 is connected to the output of inverter 19 via a monostable multivibrator 23. In FIG. 5, the sensor comprises two insulating material foils 9a and 9b, on one of which the electrodes or conductive elements 1', 2', 3', 4', 5' and 6', are suitably evaporated or printed, and the foils 9a and 9b then secured together, as by adhesive or welding, to enclose the electrodes and embed them in the insulating material body formed by the secured together foils.

We claim:

1. In a device for continuously measuring the liquid level in a container, wherein a capacitive sensor is disposed in the liquid to be measured and is connected with an oscillator as the frequency controlling element thereof, the improvement comprising:
   a capacitive sensor formed of an elongate strip of insulating material having opposite faces, and
   a plurality of elongate conductive elements embedded in the strip of material spaced approximately equidistantly from the opposite faces so that an electric field generated between the conductive elements can be substantially equally effectively acted upon simultaneously on both sides of the device by the liquid to be measured, thereby enhancing the sensitivity of the sensing element.

2. A device as claimed in claim 1, wherein the sensor is shaped in the manner of a flexible ribbon cable.

3. A device as claimed in claim 2, wherein the individual conductive elements have a rectangular cross section.

4. A device as claimed in claim 2, wherein the sensor comprises two insulating material foils, the conductive elements being formed upon one of said insulating material foils.

5. A device as claimed in claim 1, wherein the sensor comprises
   a rigid insulating material body, and the width of the conductive elements differs along their longitudinal axis.

6. A device as claimed in claim 1, wherein the oscillator comprises
   at least one integrated current circuit having a high impedance input.

7. A device as claimed in claim 6, wherein the oscillator current circuit is constructed in CMOS technology.

8. A device as claimed in claim 6, wherein the oscillator comprises three series-connected inverters, the ouput of the second one being connected via the sensor and a first resistor to the input of the first one, and via a second resistor to the output of the third one.

9. A device as claimed in claim 6, wherein a monostable multivibrator is series-connected to the oscillator so as to follow it, and a quotient measuring indicating mechanism is connected to the output of the said multivibrator.

* * * * *